US012663100B2

(12) United States Patent (10) Patent No.: US 12,663,100 B2
Vardy (45) Date of Patent: Jun. 23, 2026

(54) FIRE COLLAR

(71) Applicant: IG6 PTY LTD, Queensland (AU)

(72) Inventor: Benjamin Vardy, Queensland (AU)

(73) Assignee: IG6 PTY LTD, Queensland (AU)

( * ) Notice: Subject to any disclaimer, the term of this patent is extended or adjusted under 35 U.S.C. 154(b) by 127 days.

(21) Appl. No.: 18/016,107

(22) PCT Filed: Jul. 14, 2021

(86) PCT No.: PCT/AU2021/050752
§ 371 (c)(1),
(2) Date: Jan. 13, 2023

(87) PCT Pub. No.: WO2022/011418
PCT Pub. Date: Jan. 20, 2022

(65) Prior Publication Data
US 2023/0272869 A1 Aug. 31, 2023

(30) Foreign Application Priority Data

Jul. 14, 2020 (AU) ................................ 2020902424

(51) Int. Cl.
*F16L 5/04* (2006.01)
*A62C 2/06* (2006.01)
*F16L 55/10* (2006.01)
(52) U.S. Cl.
CPC ................ *F16L 5/04* (2013.01); *A62C 2/065* (2013.01); *F16L 55/1026* (2013.01)
(58) Field of Classification Search
CPC ..... F16L 55/1026; F16L 55/1018; F16L 5/04; F16L 5/10; A62C 2/065
See application file for complete search history.

(56) References Cited

U.S. PATENT DOCUMENTS 7,784,221 B2 * 8/2010 Truss .................. F16L 55/1026
52/220.8
2003/0192269 A1 * 10/2003 Radke ...................... H02G 3/22
52/220.8

FOREIGN PATENT DOCUMENTS

AU 2010212411 A 9/2010
AU 2016200823 A 9/2016
(Continued)

*Primary Examiner* — Adriana Figueroa
(74) *Attorney, Agent, or Firm* — Amster, Rothstein & Ebenstein LLP

(57) ABSTRACT

This invention relates to a fire collar (10) that includes a housing (11) having a bore that includes a first opening (13) and a second opening (18), said second opening being spaced from said first opening by at least one side wall (12), and wherein the fire collar further includes mounting means (14) for mounting said housing to a supporting structure, said mounting means being located adjacent said first opening. The fire collar also includes a layer of intumescent material (46) contained within the bore, adjacent the first opening, and supported in said bore adjacent the side wall. The fire collar also includes one or more torsion springs (48) which are operatively connected to the housing and wherein each spring includes a first leg (50) and a second leg (51). The second leg (51) is capable of movement between a first or non-operating position proximal to the layer of intumescent material and a second or operational position whereby said layer of intumescent material that is in contact with said second leg, either directly or indirectly, at least partially obstructs the bore, said second leg being adapted to engage said intumescent material over a substantially broad area.

10 Claims, 5 Drawing Sheets

(56)         References Cited

FOREIGN PATENT DOCUMENTS

| EP | 0890372 A | 1/1999 |
| WO | 2004072530 A | 8/2004 |
| WO | 2011032211 A | 3/2011 |

* cited by examiner

FIRE COLLAR

CROSS REFERENCE TO RELATED APPLICATION

This application claims benefit under 35 U.S.C. § 371 to international application No. PCT/AU2021/050752, filed on Jul. 14, 2021, which claims priority to Australian application no. 2020902424, filed Jul. 14, 2020, the contents of which are incorporated by reference in their entireties.

This invention relates to fire collars.

This invention has particular, but not exclusive application, to cast-in fire collars and wherein reference will be made to same. However, it will be appreciated that at least some aspects of this invention are applicable to other types of fire collars, including drop in fire collars.

Fire collars are typically used for preventing fire spreading from one side of a wall or floor to the other side via a penetration through which pipes, ducts or other service carriers pass.

Possibly one of the more important uses of fire collars is with conduits, particularly pipes and ducts, which are formed from plastics materials, such as, PVC and HDPE, but they are also used with rubber based materials, deformable metals and various composite materials.

One known type of cast-in fire collar comprises a housing having an open ended bore that is adapted to receive a conduit that in use shall extend therethrough and a mounting portion for mounting the housing to formwork used in the process of forming a concrete wall. The bore includes a first opening that is adjacent the mounting portion and a second opening that is spaced from said first opening by a substantially continuous side wall.

The fire collar also includes a thick layer of intumescent material formed into a cylinder, having an inner face and an opposing outer face, and a relatively thin layer of stainless steel gauze that is attached to the outer face so as to enclose the cylinder. The intumescent material is contained within the bore and supported by the side wall adjacent the first opening such that the layer of stainless steel gauze presses against the side wall of the bore.

The fire collar also includes actuating means, such as three or four torsions springs that are each mounted in a respective recess in the side wall.

The torsion springs each include two elongate, substantially straight, legs and whereby one leg of each spring in use is capable of moving from a non-operating mode proximal to the layer of intumescent material to an operating mode in which it extends into the bore and whereby the layer of intumescent material that is in contact with said leg at least partially obstructs the first opening. Movement of the torsion springs occurs when a fusible link holding the two legs of the spring breaks in response to the temperature of the link exceeding a predetermined level.

The intumescent material, upon exposure to heat and/or flames, will also expand, thereby further aiding in closing off the penetration. However, the intumescent material used in the construction of fire collars is not a good conductor of heat and wherein it has been noticed, where there is a high volume of smoke, the intumescent material tends to be slow to expand.

When constructing a concrete wall or floor, the cast-in fire collar would typically be secured to formwork. Then a small section of pipe, that is longer than the intended depth of the wall or floor, is inserted into the second opening so that one end of the pipe rests against the formwork while the other end extends away from the second opening whereby after pouring the concrete the fire collar shall be embedded in the concrete and the second end of the pipe shall protrude from the concrete.

After the formwork is stripped away, the pipe section is knocked out and replaced by a complete pipe section.

The distance separating the first and second openings of the cast-in fire collar described above is typically at least 110 mm so as to accommodate the length of the torsion springs and wherein fire collars of this type are typically used in the construction of walls and floors having a thickness of at least 150 mm. However, not all concrete walls or floors have a wall thickness that is greater than say 150 mm.

It is an object of the present invention to provide an improved fire collar which alleviates at least some of the problems associated with the prior art and which will be reliable and efficient in use.

With the foregoing and other objects in view, this invention relates to a fire collar including:

a housing having a bore that includes a first opening and a second opening, said second opening being spaced from said first opening by at least one side wall;

mounting means for mounting said housing to a supporting structure, said mounting means being located adjacent said first opening;

a layer of intumescent material contained within said bore, adjacent said first opening, and supported in said bore adjacent said side wall;

at least one recess in said side wall, and a torsion spring that is located in said recess and which is operatively connected to said housing, said torsion spring including a first leg and a second leg that are separated by and connected to an intermediate body portion consisting of a plurality of coils, said first and second legs extending tangentially away from said body, and wherein said second leg is capable of movement between a first or non-operating position proximal to said layer of intumescent material and a second or operational position whereby said layer of intumescent material that is in contact with said second leg, either directly or indirectly, at least partially obstructs said bore, said second leg including at least one bend at or near an end that is remote from said body.

In another aspect, this invention relates to a fire collar including:

a housing having a bore that includes a first opening and a second opening, said second opening being spaced from said first opening by at least one side wall;

mounting means for mounting said housing to a supporting structure, said mounting means being located adjacent said first opening;

a layer of intumescent material contained within said bore, adjacent said first opening, and supported in said bore adjacent said side wall;

one or more recesses in said side wall, and one or more torsion springs located in a respective one of said recesses, said one or more torsion springs being operatively connected to said housing, and said one or more torsion springs including a first leg and a second leg that are separated by and connected to an intermediate body portion consisting of a plurality of coils, said first and second legs extending tangentially away from said body, and wherein said second leg is capable of movement between a first or non-operating position proximal to said layer of intumescent material and a second or operational position whereby said layer of intumescent material that is in contact with said second leg, either directly or indirectly, at least partially obstructs said bore, said second leg being adapted to engage said intumescent material over a substantially broad area.

Preferably, the second leg is adapted to engage said intumescent material over an area having a width that is approximately the same as the length of the body.

Preferably the torsion spring may be manufactured from a length of wire made from a suitable material, such as mild steel. Further, the first and second legs may extend tangentially away from the body in generally the same direction.

The second leg includes one or more bends partway along its length such that the leg, or at least most of said leg, is contained within a plane that is perpendicular to a longitudinal axis of the body and wherein the portion of the leg contained in said plane has a width greater than the diameter of the wire used in the manufacture of the torsion spring. Preferably, the width of the leg contained in said plane is greater than say half the length of the body and more preferably is approximately the same as, or even greater than the length of the body.

For example, the distal end portion of the second leg may include a single return. That is to say, the distal end portion extends away from a lower or distal end portion of the leg and to one side of the leg. However, in other instances, the distal end portion may include multiple returns or wherein the distal end portion may resemble a loop or may have a configuration that is hook like.

The first leg may be substantially straight. However, it is preferred that it also includes one or more bends. Preferably, the first leg includes two bends whereby much of the first leg is aligned with a mid-portion of the body.

The second leg is preferably retained in its non-operating position by actuation means that is intended to actuate in response to the surrounding temperature exceeding a predetermined level. For example, the distal end portions of the first and second legs may be held in close proximity to one another by a sacrificial component, such as a fusible link.

In still yet another embodiment, this invention relates to a fire collar including:

a housing having a bore that includes a first opening and a second opening, said second opening being spaced from said first opening by at least one side wall;

mounting means for mounting said housing to a supporting structure, said mounting means being located adjacent said first opening, and a layer of intumescent material contained within said bore, adjacent said first opening, and supported in said bore by retaining means, said intumescent material having an inner face that faces the interior of said bore and an outer face that faces said side wall, said layer of intumescent material being spaced from said side wall by spacing means such that there is provided a gap between said intumescent material and said side wall, whereby in use hot gases created by a fire may enter said bore via said first opening and may circulate within said gap.

Preferably there is provided at least one gap, or a plurality of gaps, that shall in use permit hot gases to pass over much, if not all, of the outer face of the layer of intumescent material.

The layer of intumescent material may include one or more discrete segments and wherein the segments may be secured within the bore so that they form a substantially continuous wall of intumescent material. Preferably, the fire collar includes one or more segments of intumescent material that form a cylinder having an inner face and an opposing outer face.

The outer face of the intumescent material is preferably spaced from the side wall by spacing means, such as one or more protrusions that extend away from the side wall in the direction of the bore. The protrusions may include ribs and wherein the ribs may extend partway between the first opening and the second opening. Alternatively, the spacing means may include one or more raised wall portions, such as a plurality of knobs. Further, the spacing means may be formed integrally with the side wall.

However, it will be appreciated that in another embodiment, the spacing means may include the actuation means and/or the retaining means.

There may also be provided support means that is intended to provide the layer of intumescent material with some structural integrity as the material in use softens and expands due to an increase in the temperature of the material. For example, the outer face of the intumescent material may be covered with a layer of stainless steel gauze and wherein the gauze may be secured to the intumescent material. For example, the gauze may be attached to the outer face of the intumescent material by one or more staples.

Preferably the fire collar also includes actuating means operatively connected to said housing for movement from a non-operating mode proximal to said layer of intumescent material to an operating mode in which it moves in a longitudinal plane through said first opening relative to the conduit to force at least a portion of said layer of intumescent material to at least partially obstruct said opening in response to the temperature reaching a predetermined level.

For example, the actuation means may include one or more torsion springs that are each mounted in a respective recess in the side wall.

The torsion springs may each include two elongate, substantially straight, legs and whereby one leg of each spring in use is capable of moving from a non-operating mode proximal to the layer of intumescent material to an operating mode in which it extends into the bore and whereby the layer of intumescent material that is in contact with said leg at least partially obstructs the first opening. Movement of the torsion springs occurs when a fusible link holding the two legs of the spring breaks in response to the surrounding temperature exceeding a predetermined level.

Preferably the torsion spring includes a first leg and a second leg that are separated by and connected to an intermediate body portion consisting of a plurality of coils, said first and second legs extending tangentially away from said body in generally the same direction, and wherein said second leg is capable of movement between a first or non-operating position proximal to said layer of intumescent material and a second or operational position whereby said layer of intumescent material that is in contact with said second leg, either directly or indirectly, at least partially obstructs said bore, said second leg including at least one bend.

Alternatively, the torsion spring may include a first leg and a second leg that are separated by and connected to an intermediate body portion consisting of a plurality of coils, said first and second legs extending tangentially away from said body in generally the same direction, and wherein said second leg is capable of movement between a first or non-operating position proximal to said layer of intumescent material and a second or operational position whereby said layer of intumescent material that is in contact with said second leg, either directly or indirectly, at least partially obstructs said bore, said second leg being adapted to engage said intumescent material over a substantially broad area.

Preferably, the second leg is adapted to engage said intumescent material over an area having a width that is approximately the same as the length of the body.

Preferably the torsion spring may be manufactured from a length of wire made from a suitable material, such as mild steel.

The second leg includes one or more bends partway along its length such that the leg, or at least most of said leg, is contained within a plane that is perpendicular to a longitudinal axis of the body and wherein the portion of the leg contained in said plane has a width greater than the diameter of the wire used in the manufacture of the torsion spring. Preferably, the width of the portion of the leg contained in said plane is greater than say half the length of the body and more preferably is approximately the same as, or even greater than the length of the body.

For example, the distal end portion of the second leg may include a single return. That is to say, the distal end portion extends away from the leg and to one side of the leg. However, in other instances, the distal end portion may include multiple returns or wherein the distal end portion may resemble a loop or may have a configuration that is hook like.

The first leg may be substantially straight. However, it is preferred that it also includes one or more bends. Preferably, the first leg includes two bends whereby much of the first leg is aligned with a mid-portion of the body.

The second leg is preferably retained in its non-operating position by actuation means that is intended to actuate in response to the surrounding temperature exceeding a predetermined level. For example, the distal end portions of the first and second legs may be held in close proximity to one another by a fusible link.

The terms "upper", "lower", "side" and similar terms are used herein for the purpose of describing the invention in its normal in use position in a building floor unless the context clearly indicates another meaning and are not intended to limit the invention to use in any particular orientation and it is to be understood that the invention could be used in floors, walls, ceilings and other barriers of various types and orientations. It is also to be understood that the term "longitudinal" used herein refers to the direction of a conduit as it passes through a fire collar according to the invention unless the context clearly indicates another meaning.

In order that this invention may be more easily understood and put into practical effect, reference will now be made to the accompanying drawings wherein.

Figure 1:
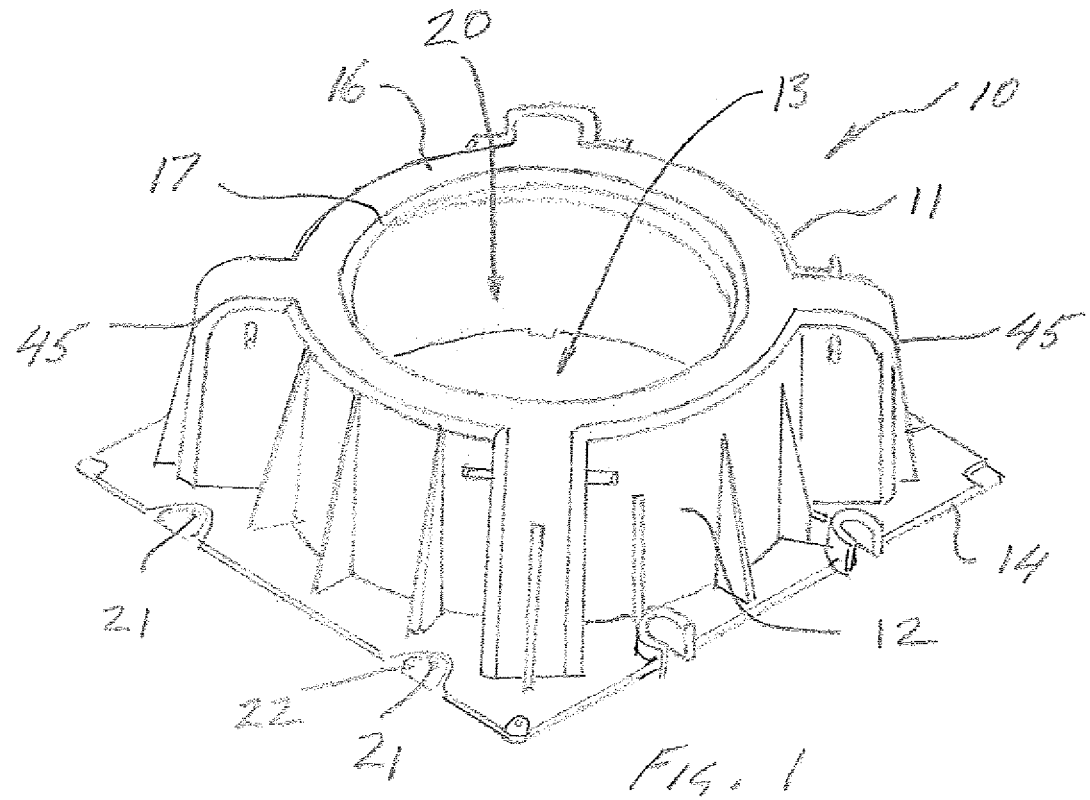
FIG. 1 is a pictorial view of a fire collar constructed in accordance with the present invention.
Figure 2:
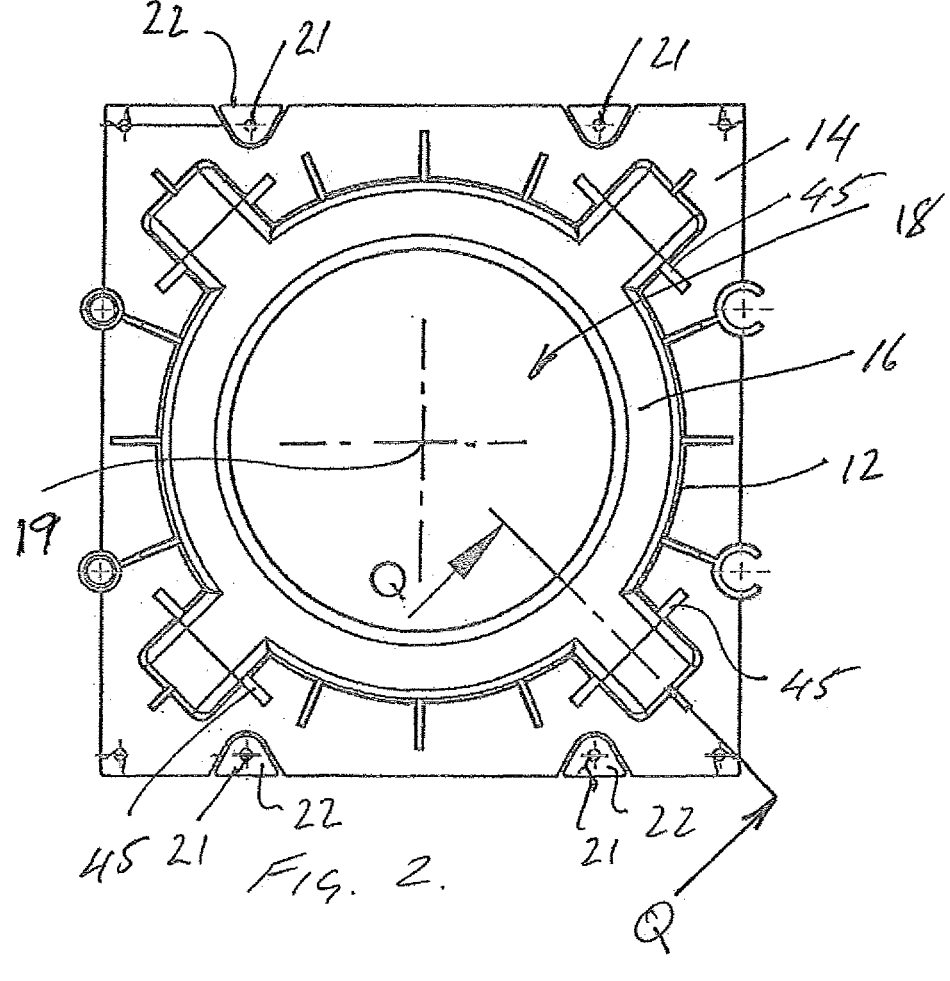
FIG. 2 is a plan view of the fire collar illustrated in FIG. 1.

The fire collar 10, illustrated in FIGS. 1 to 6, includes a housing 11 constructed of a plastics material and has a generally cylindrical side wall 12 which defines a bottom opening 13 and terminates in an outwardly extending bottom flange 14 at one end contiguous with the side wall 12 and an inwardly extending top flange 16 at its upper end also contiguous with the side wall 12 which terminates in a cylindrical guide ring 17 defining a top opening 18 that is adapted to receive therethrough a typical 100 mm PVC sewer pipe or ventilation duct (not shown). Suitably, the top and bottom openings are coaxial with the cylindrical side wall 12 along axis 19 and in combination with said side wall define a passage 20 extending therebetween.

The bottom flange 14 is adapted to rest against a sheet of concrete formwork and be secured thereto so that a concrete wall or floor can be poured around the housing. A plurality of screw holes 21 are provided around the flange 14 for securing the housing 11 to the formwork. Advantageously, the holes 21 are provided in frangible portions 22 of the flange 14 which break off upon removal of the formwork and remain therewith.

Four equi-angularly spaced, elongate, generally rectangular shaped, openings 23 are provided in the side wall 12 and wherein two spaced apart radial walls 24 and 25 extend outwardly therefrom and, in combination with an intermediate, substantially planar, outer wall 26, that is substantially parallel to side wall 12, define four recesses 27.

Each recess 27 houses therein a torsion spring 28 having a body 29 consisting of a plurality of helical coils and two opposing legs 30 and 31, each having a connecting portion 32 and 33 respectively, that extends tangentially away from the body in generally the same direction.

The first leg 30 includes a first bend 34, located at an end of the connecting portion 32 and generally adjacent a first end 35 of the body 29, and a second bend 36, the bends being connected by an intermediate portion 37 that extends generally away from the first end 35. Further, the obtuse angles of both bends are substantially the same such that a distal end portion 38 of the first leg, which is connected to the intermediate portion 37 at the second bend 36, is generally parallel to, and contained in the same plane as, the connecting portion 32.

The second leg 31 includes a first bend 39, located at an end of the connecting portion 33 and generally adjacent a second bend 40 of the body 29, and a second bend 41, the bends 39 and 41 being connected by an intermediate portion 42, and wherein the bend 41 is spaced from the bend 39 in a direction that is generally parallel to a longitudinal axis of the body 29 a distance generally equal to the length of the body.

The second leg 31 further includes a distal end portion or return 43 that is connected to the bend 41 and which extends away from the bend 41 in a direction that is generally parallel to the longitudinal axis of the body 29, and wherein the distal end portion 43 terminates generally in line with the connecting portion 33. Further, the connecting portion 33, intermediate portion 42 and the distal end portion 43 are all contained in a plane that is generally tangential to the body 29.

The two legs 30 and 31, which have a tendency to splay apart, are retained in parallel planes by a fusible link 44 that is connected to the two distal end portions 38 and 43.

Figures 3, 4:
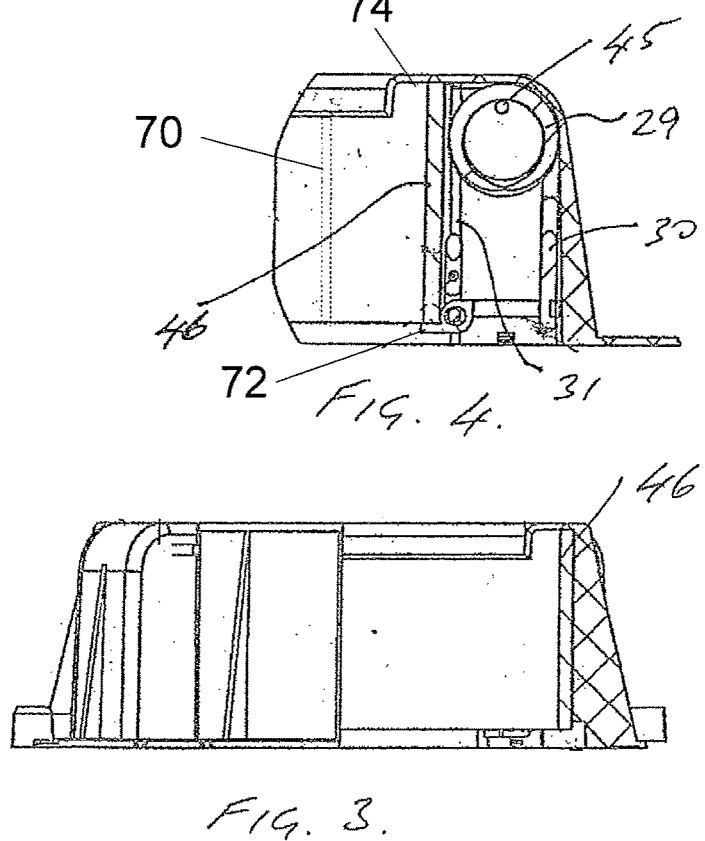
FIG. 3 is a partial cross-sectional side view of the fire collar illustrated in FIG. 1.
FIG. 4 is cross-sectional side view of the fire collar illustrated in FIG. 1 along line Q-Q.
Figures 5, 6:
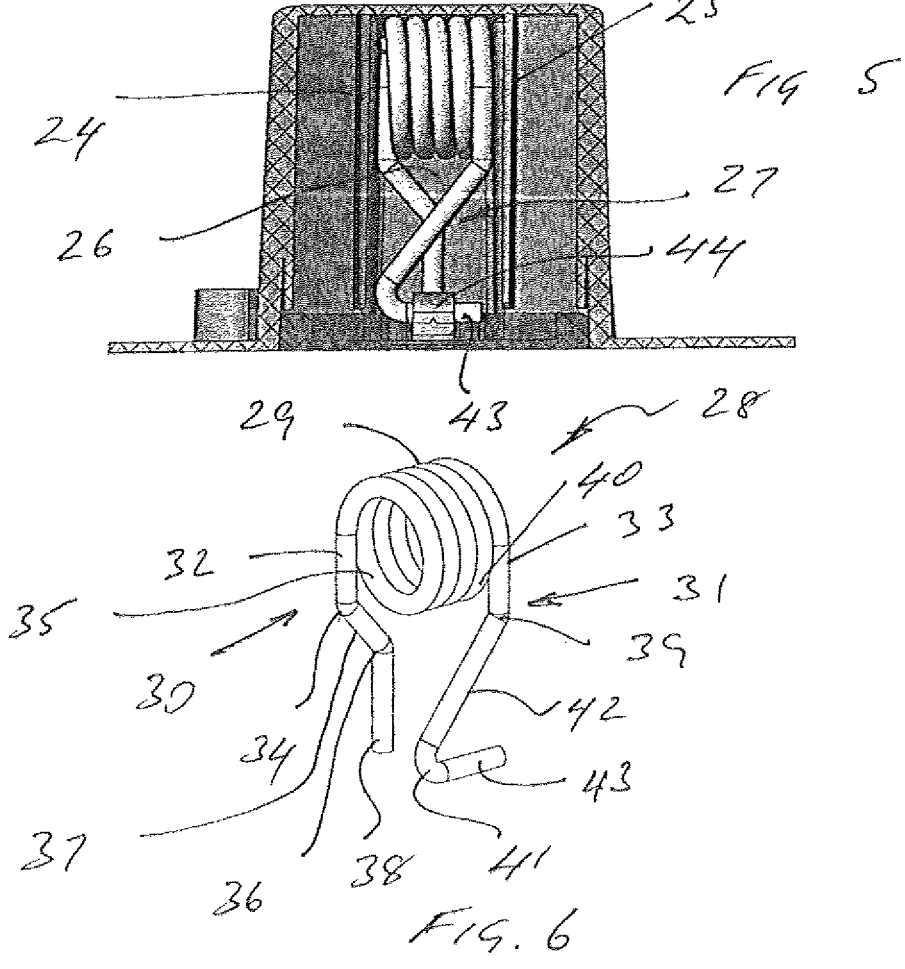
FIG. 5 is a cross-sectional view of a portion of the fire collar illustrated in FIG. 1.
FIG. 6 is a pictorial view of a torsion spring constructed in accordance with the present invention and as illustrated in FIG. 5.

Each torsion spring 28 is retained in a respective recess 27 by a pin 45 that extends through aligned apertures in the radial walls 24 and 25, such that the intermediate portion of the pin 45 extends through the coils of the body and whereby the coils rest on the intermediate portion, as shown in FIG. 4, and the first leg presses against an inner face of the outer wall 26.

Referring to FIG. 4, a layer of intumescent material of known type, typically neoprene based or high density polypropylene, formed into a cylinder 46 and enclosed by a layer of stainless steel gauze, is fitted within the housing 11 adjacent the inner face of the cylindrical wall 12. In this particular embodiment, the intumescent material and the surrounding gauze is retained in place by engagement of a lower edge portion of the intumescent material with an end portion 72 of each of the links 44, while an upper edge portion of the cylindrical-shaped intumescent material 46 abuts an underside 74 of the top flange 16. The outer face of the intumescent material 46 is preferably spaced from the interior surface of side wall 12 by a spacer or spacing means 70 (as illustratively depicted in FIG. 4 by a pair of vertically orientated broken lines), such as one or more protrusions that extend away from an interior surface of side wall 12 in the direction of the axis 19 of the bore/passage 20. The protrusions 70 may include ribs which can extend partway between the first opening 13 and the second opening 18. Alternatively, the spacing means 70 may include one or more raised wall portions, such as a plurality of knobs. Further, the spacing means may be formed integrally with the side wall.

In the event of a fire in close proximity to the fire collar, the ambient air increases in temperature and causes the fusible link 44 to soften and break under the spring force of the torsion spring 28 (or alternatively it melts) whereupon the spring is released and the first leg 30 bears against the outer wall 26 and the second leg 31 bears against the gauze and through the gauze the intumescent material 46, thereby forcing the gauze and the intumescent material encased thereby inwards towards the axis 19 so that it obstructs the passage 20.

It will be appreciated that the PVC duct or pipe passing through the passage will have softened coincidentally and may have even burned to an extent allowing the legs 31 in combination to crush it inwards while forcing the intumescent material into the passage or at least into engagement with the crushed pipe. It will also be appreciated that as the intumescent material increases in temperature, it will expend and fully close passage 20 thereby preventing the egress of smoke and poisonous gases from the site of the fire.

Advantageously, the stainless steel gauze also assists operation of the fire collar in directing expansion of the intumescent material inwards rather than outwards which in turn assists in forcing the collapse of the conduit or pipe therein.

It is believed that by increasing the width of the section of intumescent material that the leg 31 bears against by altering the configuration of the leg, which in the prior art was substantially straight, it is possible to obtain the same effect using a torsion spring wherein the distance separating the distal end portion from the body is shorter. Consequently the height of the fire collar, namely the distance between the top and bottom openings, is less than the prior art fire collars and whereby fire collars constructed in accordance with the present invention may be cast in the construction of walls and floors having a thickness of say . . . mm to 150 mm.

Figures 7, 8:
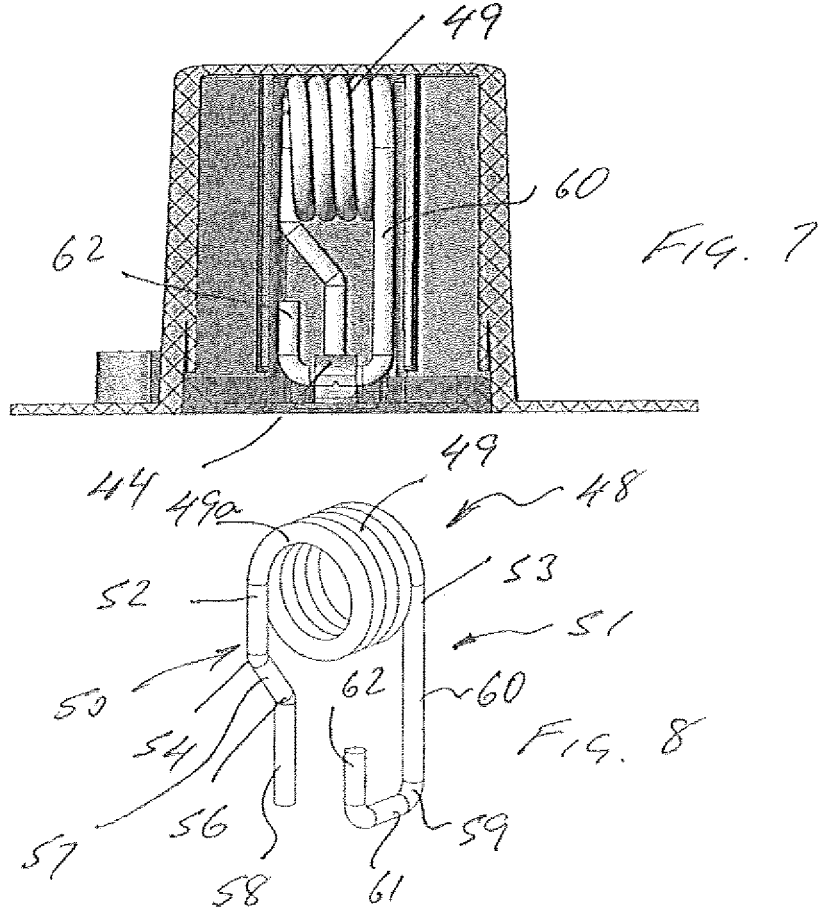
FIG. 7 is a pictorial view of a portion of an alternative fire collar constructed in accordance with the present invention.
FIG. 8 is a pictorial view of a torsion spring constructed in accordance with the present invention and as illustrated in FIG. 7.

FIGS. 7 and 8 show another torsion spring 48 that may be used in place of the torsion spring 28. The torsion spring 48 includes a body 49 consisting of a plurality of helical coils and two opposing legs 50 and 51, each having a connecting portion 52 and 53 respectively, that extends tangentially away from the body in generally the same direction.

The first leg 50 includes a first bend 54, located at an end of the connecting portion 52 and generally adjacent a first end 49a of the body 49, and a second bend 56, the bends being connected by an intermediate portion 57 that extends generally away from the first end 49a. Further, the obtuse angles of both bends are substantially the same such that a distal end portion 58 of the first leg, which is connected to the intermediate portion 57 at the second bend 56, is generally parallel to, and contained in the same plane as, the connecting portion 52.

The second leg 51 includes a first bend 59, located at an end of a substantially straight intermediate portion 60 that is aligned with and connected to the connecting portion 53 and a first return 61 that is connected to the bend 59 and which extends away from the bend 59 in a direction that is generally parallel to the longitudinal axis of the body 49, and a second return 62 that extends away from the first return in a general direction of the body 49, whereby the connecting portion 53, the intermediate portion 60, the first return 61 and the second return 62 are all contained in a plane that is generally tangential to the body 49. Further, the second return 62 is generally aligned with the connecting portion 52.

The foregoing description has been given by way of illustrative example of the invention and many modifications and variations which will be apparent to persons skilled in the art may be made without departing from the spirit and scope of the invention as defined by the appended claims.

The invention claimed is:

1. A fire collar including:
a housing having a bore that includes a first opening and a second opening, said second opening being spaced from said first opening by at least one side wall in which there is formed a plurality of recesses and wherein adjacent recesses of the plurality of recesses are connected to one another by one or more side wall portions;
at least one mount for mounting said housing to a supporting structure, said at least one mount being located adjacent said first opening; and
a layer of intumescent material contained within said bore, adjacent said first opening, and supported in said bore by a retainer, said intumescent material having an inner face that faces the an interior of said bore and an outer face that faces said one or more side wall portions, said layer of intumescent material being spaced from said one or more side wall portions by one or more spacers such that there is provided a gap between said intumescent material and said one or more side wall portions, wherein during use hot gases created by a fire and which enter said bore via said first opening can circulate within said gap.

2. A fire collar according to claim 1, wherein said fire collar further includes a plurality of actuators each operatively connected to said housing and being at least partially located within a respective one of said plurality of recesses, each of said plurality of actuators being capable of movement from a non-operating mode proximal to said intumescent material to an operating mode in which at least one of said plurality of actuators shall move at least a portion of said intumescent material generally towards a longitudinal axis of said bore.

3. A fire collar according to claim 2, wherein each of said plurality of actuators is a torsion spring that includes a first leg and a second leg that are separated by and connected to an intermediate body portion consisting of a plurality of coils, said first and second legs extending tangentially away from said body portion, and wherein said second leg is capable of movement between a first or non-operating position proximal to said layer of intumescent material and a second or operational position whereby said layer of intumescent material that is in contact with said second leg, either directly or indirectly, at least partially obstructs said bore, said second leg having at least one bend partway between its ends so that said second leg shall engage said intumescent material over a substantially broad area.

4. A fire collar according to claim 3, wherein said second leg includes a connecting portion that is connected to and extends tangentially away from one end of said body portion, said connecting portion having a longitudinal axis that is substantially parallel to the longitudinal axis of said bore when said second leg is in its first or non-operating position, and a distal end portion that is connected to said body portion by said connecting portion, said distal end portion including a leg portion that is adapted to engage said intumescent material over a substantially broad area, said leg portion having a longitudinal axis that is substantially perpendicular to said longitudinal axis of said connecting portion.

5. A fire collar as claimed in claim 3, wherein said one or more spacers includes a plurality of fusible links that are each connected to said first and second legs of a respective one of said torsion springs and which are adapted to retain said second leg in a first or non-operational position.

6. A fire collar as claimed in claim 5, wherein said plurality of fusible links each include a distal end portion that extends beyond into said bore and which is adapted to engage an adjacent portion of said layer of intumescent material to retain said layer of intumescent material in said bore.

7. A fire collar including:

a housing having a bore that includes a first opening and a second opening, said second opening being spaced from said first opening by at least one side wall in which there is formed a plurality of recesses and wherein adjacent recesses are connected to one another by one or more side wall portions;

at least one mount for mounting said housing to a supporting structure, said at least one mount being located adjacent said first opening;

a layer of intumescent material contained within said bore, adjacent said first opening, and supported in said bore adjacent said one or more side wall portions, said layer of intumescent material being spaced from said one or more side wall portions by one or more spacers such that there is provided a gap between said intumescent material and said one or more side wall portions; and a plurality of torsion springs each being connected to said housing and at least partially located within a respective one of said plurality of recesses, each of said plurality of torsion springs having a first leg and a second leg that are separated by and connected to an intermediate body portion consisting of a plurality of coils, said first and second legs extending tangentially away from said body portion, and wherein said second leg is capable of movement between a first or non-operating position proximal to said layer of intumescent material and a second or operational position whereby said layer of intumescent material that is in contact with said second leg, either directly or indirectly, at least partially obstructs said bore, wherein said second leg includes a connecting portion that is connected to and extends tangentially away from one end of said body portion, said connecting portion having a longitudinal axis that is substantially parallel to the longitudinal axis of said bore when said second leg is in its first or non-operating position, and a distal end portion that is connected to said body portion by said connecting portion, said distal end portion including a leg portion that is adapted to engage said intumescent material over a substantially broad area, said leg portion having a longitudinal axis that is substantially perpendicular to said longitudinal axis of said connecting portion.

8. A fire collar according to claim 7, wherein said layer of intumescent material is supported in said bore by a retainer, said intumescent material having an inner face that faces the an interior of said bore and an outer face that faces said one or more side wall portions, wherein hot gases created by a fire enter said bore via said first opening and circulate within said gap.

9. A fire collar as claimed in claim 8, wherein said one or more spacers includes a plurality of fusible links that are each connected to said first and second legs of a respective one of said plurality of torsion springs and which are adapted to retain said second leg in a first or non-operational position.

10. A fire collar as claimed in claim 5, wherein said plurality of fusible links each include a distal end portion that extends beyond into said bore and which is adapted to engage an adjacent portion of said layer of intumescent material to retain said layer of intumescent material in said bore.

* * * * *